(12) United States Patent
Herbertsson et al.

(10) Patent No.: US 8,459,937 B2
(45) Date of Patent: Jun. 11, 2013

(54) UNITY WIND POWER PLANT WITH VERTICAL AXIS OF ROTATION

(75) Inventors: Harald Herbertsson, Forserum (SE); Claes Aldman, Uppsala (SE); Ralph Harrysson, Trollhättan (SE)

(73) Assignees: Harald Herbertsson (SE); Claes Aldman (SE); Irene Young (TW)

( * ) Notice: Subject to any disclaimer, the term of this patent is extended or adjusted under 35 U.S.C. 154(b) by 819 days.

(21) Appl. No.: 12/665,114

(22) PCT Filed: Jun. 11, 2008

(86) PCT No.: PCT/SE2008/000388
§ 371 (c)(1),
(2), (4) Date: Dec. 17, 2009

(87) PCT Pub. No.: WO2008/156407
PCT Pub. Date: Dec. 24, 2008

(65) Prior Publication Data
US 2010/0181778 A1 Jul. 22, 2010

(30) Foreign Application Priority Data
Jun. 19, 2007 (SE) ................................. 0701497

(51) Int. Cl.
*F03D 11/00* (2006.01)
(52) U.S. Cl.
USPC ............... 415/141; 415/4.2; 415/4.4; 416/88; 416/141; 416/227 R

(58) Field of Classification Search
USPC .......... 415/4.2, 4.4, 133, 141; 416/88, 227 R, 416/141, 19; 290/44, 55
See application file for complete search history.

(56) References Cited

U.S. PATENT DOCUMENTS

| 4,421,458 | A | * | 12/1983 | Allan et al. | .................... | 416/117 |
| 4,624,624 | A | * | 11/1986 | Yum | ................................ | 416/87 |
| 7,090,550 | B2 | * | 8/2006 | Wilkie | ............................. | 440/49 |
| 7,656,055 | B2 | * | 2/2010 | Torres et al. | .................... | 290/55 |
| 7,985,048 | B2 | * | 7/2011 | Jones | .............................. | 416/87 |

* cited by examiner

*Primary Examiner* — Ninh H Nguyen
(74) *Attorney, Agent, or Firm* — Bacon & Thomas, PLLC

(57) ABSTRACT

A wind power plant has a turbine with its axis of rotation (1) substantially at right angle to wind direction, and wings (2) protruding from the axis (1) and the wings (2) have their crossways extension essentially in vertical direction. The wings (2) can be in odd as well as even number distributed around the axis of rotation (1), and composed of wing elements (21-24 and 31, 32) of optional length. For formation of the wings (2), the wing elements (21-24) are connected into a torsion link configuration (like a row of pairs of scissors), and thus synchronously movable in relation to each other. To adjust the extension of the wing elements (21-24 and 31, 32) an along the axis of rotation (1) adjustable sleeve means (4) is present, to which the inner end of an inner wing element (21) is connected.

8 Claims, 4 Drawing Sheets

UNITY WIND POWER PLANT WITH VERTICAL AXIS OF ROTATION

BACKGROUND OF THE INVENTION

1. Field of the Invention

The invention refer primarily to a wind power plant with rotation axis substantially at right angle to wind direction.

2. Description of Related Art

Such exists in several different forms of execution, among them designs with mainly straight wings mounted on bars attached to a vertical axis of rotation. There is also a wind turbine patented by George Darrieus in 1931 consisting of one or more arched wing blades, which rotate around a vertical axis, and are attached at both ends to said axis.

Mankind has for at least two millennia tried to utilize the power of the wind. Wind mills of different designs, and with varying quality, were put to use early, but it was not until the European Middle Ages that windmills useable for grinding grains were designed. Dutch designers succeeded during the 16th century to design wind mills with reasonably high efficiency. These were four-winged with horizontal axis of rotation and an angled transmission to a vertical axis, which powered the grind stones revolving round a vertical axis.

During the 1880ies wind mills with multiple wing blades, still with a horizontal axis of rotation and an angled transmission, where developed in the prairie states of USA for pumping water in the farming districts. This led to an increased interest in using wind powered devices to produce electrical power. During the first decade of the 20 century, there were in Denmark some hundred wind powered electrical generators erected on lattice masts. Up until George Darrieus presented his wind turbine all wind motors were designed with a horizontal axis of rotation on which two or four wings or propeller blades where attached. Utilizing an angled transmission the horizontal rotation where transferred to a vertical axis of rotation, this axis being of necessary length to reach the equipment at ground level, which where to use the rotational power.

Following the 1973 oil crisis there were a renewed interest in using wind power plants, particularly in designs with horizontal axis of rotation, to produce electrical power. Following some twenty years of development there had in the Nordic countries been developed a kind of standard for wind turbines mounted in towers 40-50 meter high, and with a wind turbine having a diameter of approximately the same dimensions.

Wind power plants with a horizontal axis are usually designed for wind speeds up to 12-14 m/s. To make sure that higher wind speeds do not overload the attached electrical generator, the rotational speed of the wind turbine has to be limited. This is usually done either by turning the turbine blades (feathering them) or by designing the turbine blades to stall at high wind speeds.

Irrespective of which design is chosen, it leads to the rotational speed of the wind turbine being limited, and this in combination with the axis of the turbine being equipped with a mechanical break, protect the electric generator from being overloaded.

THEORETICAL BACKGROUND

Weibull Distribution

If one measures the wind speed at different districts or places throughout a year, one will notice that in most areas the strong gale force winds are rare, while moderate and fresh winds are quite common. The wind variations for a district is usually described using the so-called Weibull distribution, as shown in FIG. 1. The Weibull distribution is a probability density distribution. The area under the graph is always exactly 1, since the probability that the wind will be blowing at some wind speed including 0 m/s must be 100%.

Half the area under the graph in FIG. 1 is to the left of the vertical line at 6.6 m/s where 6.6 m/s is the median of the distribution. This means that half of the time it will be blowing less than 6.6 m/s, and the other half of the time it will be blowing faster than 6.6 m/s. It is evident from FIG. 1 that the most common wind speed is 5.5 m/s. If one multiply each tiny wind speed interval with the probability for that wind speed, and then add it all up, one get the average wind speed; for FIG. 1 we get the average wind speed 7 m/s. It is evident from the Weibull distribution that most of the time the wind blows at a speed lower than the average wind speed.

The statistical distribution of wind speeds varies from place to place around the earth, depending on local climate conditions and the shape of the landscape, among other things. This causes the Weibull distribution to vary in both shape and average value.

Average Power of the Wind

From the Weibull distribution in FIG. 1, it is obvious that lower wind speeds are more common than higher wind speeds, on the other hand does the energy content of the wind increase as a volume function of the wind speed, i.e. if the wind speed doubles the energy content of the wind increases eight times. Hence, even if it is unusual that the wind blows at high wind speed, gale force winds do contain lots of energy. If the wind conditions are such as in FIG. 1 it is evident that the wind blows at wind speeds in the interval 1 m/s to 17 m/s. At a wind speed of 1 m/s the wind has the power of 0.61 W/m2 swept area and at 17 m/s some 4900 times as high, i.e. some 3000 W/m2.

If the wind conditions are described by a Weibull distribution with average wind speed of 7 m/s and shape parameter 2, the average power will equal a wind speed of 8.7 m/s and hold the power of 402 W/m2.

Betz-Lag

If one tries to extract all the kinetic energy from the wind, the wind speed on the lee-side of the wind turbine would be 0 m/s, i.e. the air would not be able to leave the wind turbine, and hence the air would remain at stationary, and one would not harvest any energy at all. On the other hand if the wind passes the wind turbine without any deceleration at all, no energy would be harvested either. Maximal energy is harvested for some wind speed inbetween.

The German physicist Albert Betz published in year 1919 his calculations on extraction of energy from the wind. Betz proved the reasonable assumption that the average wind speed through the wind turbine is the average of the undisturbed wind speed into the wind turbine $v_1$ and the wind speed out from the wind turbine $v_2$, i.e. $(v_1+v_2)/2$.

The mass of the air that each second passes through the wind turbine amounts to $$m = \tfrac{1}{2}\rho A(v_1+v_2)$$

where m is the mass per second, $\rho$ is the air density, A is the area swept by the wind turbine and $(v_1+v_2)/2$ is the average wind speed through the wind turbine. Newton's second law then gives that the power extracted from the wind is mass multiplied by the difference between the square of the incoming wind speed and the square of the outgoing wind speed:

$$P = \tfrac{1}{2}m(v_1^2 - v_2^2)$$

If we now substitute m from the first equation in to the second equation we get $$P = (\rho A/4)(v_1^2 - v_2^2)(v_1+v_2)$$

In comparison would the total power of the undisturbed wind passing through the same area A without any deceleration be $$P_0 = \tfrac{1}{2}\rho A v_1^3$$

If one take the ratio, the power extracted from the wind and the power from the undisturbed wind, one gets:

$$(P/P_0) = \tfrac{1}{2}(1-(v_2/v_1)^2)(1+(v_2/v_1))$$

It is possible to show that this ratio reaches its maxima for $v_2/v_1 = \tfrac{1}{3}$.

Thus, the maximally extracted energy occurs for a wind deceleration of b, for which one extracts the maximal 16/27th of the wind energy.

Power Density Function

It holds for the power density function of the wind that it is proportional to the cube of the wind speed, and directly proportional to the air density.

By multiplying the power at each wind speed with the probability for that wind speed such as the Weibull distribution shows, one gets a distribution which shows the wind power for different wind speeds, i.e. one gets a power density distribution. If one then multiply the power density distribution with ⅔ one gets a power density distribution for the maximally extractable power at different wind speeds in accordance with Betz law.

The uppermost graph in FIG. 2 shows such a power density distribution, the middle graph shows the maximally extractable power density distribution in accordance with Betz law, the lower graph shows the power density distribution of the from the wind turbine extracted power.

Two important conclusions are evident from the graphs in FIG. 2, one is that the main part of the energy extracted from the wind is extracted at wind speeds above the average wind speeds at the wind power plant. The other is the desire that through optimization of the shape of the wind turbine achieve that the lower graph, which represents the true extracted energy, comes as close as possible to the middle graph, which represents the theoretically extractable energy.

When it comes to the true extracted energy from the wind turbine one has to consider that the wind turbine is designed to start rotating at some low wind speed, usually in the interval 3 to 5 m/s. This wind speed is called the "cut-in" speed. For wind speeds below the cut-in speed no energy is extracted. Likewise, the wind turbine is designed to be stopped at high wind speeds, usually at a wind speed in the interval 14 to 17 m/s according to the Swedish National Encyclopedia, this wind speed is called "cut-out" speed. The reason to the wind turbine is stopped at high wind speeds is not to risk overloading the wind turbine and its surrounding equipment, such as transmission and electric generator. For wind speeds above the cut-out speed no energy is harvested.

Power Coefficient

The power coefficient describes how efficiently the wind turbine turns wind energy into electric energy.

The power coefficient is deduced by dividing the electric power by the wind power, i.e. the for each given wind speed delivered electric power from the wind power plant, is divided by the for that given wind speed maximally extractable power according to Betz law.

FIG. 3 shows the power coefficient for an average, Danish wind power plant with horizontal axis of rotation. It is evident from the graph that although the average efficiency is some 20%, the efficiency varies strongly with the wind speed. As is evident from the graph the highest mechanical efficiency (in this case 44%) occurs for a wind speed of approximately 9 m/s: this is a deliberate choice when designing the wind turbine. The traditional view have been that the efficiency at low wind speeds is of no importance, because there is so little energy to harvest anyway. The relatively low efficiency at high wind speeds has been considered acceptable, because the wind turbine can not be allowed to harvest more energy than the electric generator is designed for. Therefore it is most important with a high efficiency for wind speeds for which the energy can be harvested.

A traditional wind turbine is designed to have an optimal static power coefficient for the district it will be erected in, to be in accordance with the Weibull distribution of wind speeds for that place.

SUMMARY OF THE INVENTION

The problem to be solved by the present invention is: for a wind motor with rotation axis substantially at right angle to the wind direction to furnish a wind turbine which is dynamically adjustable to allow a high efficiency, high power coefficient, for wind speeds at a large interval. This to maximize the energy harvested from the wind.

The invention is characterized by the from the wind turbines axis of rotation extendable dynamically adjustable wings, for harvesting energy from the wind. These dynamically adjustable wings are designed as torsion linked wing elements (like pairs of scissors).

The wings adjustable wing elements are connected two and two at approximately half their length in a torsion link arrangement. One end of one of the wing elements is stationary attached at the axis or rotation, while one end of the other wing element is vertically adjustable along the axis of rotation. At the free ends extending away from the axis of rotation it is possible to attach additional wing elements, these too in a torsion link arrangement. It is possible to attach several wing elements in a torsion link arrangement in a row extending away from the axis of rotation, the outermost wing elements being of half length and constituting, together with the second outermost wing elements, a closed rhombus. When the innermost wing elements, along the axis of rotation adjustable end, changes vertical position it also affects the outer existing torsion links rhombic form. The wing elements are adjustable to the degree that their rhombic shape can be adjusted from having its longest diagonal in substantially horizontal or substantially vertical direction. It is not necessary that all rhombuses occurring in the wing are of similar size, e.g. the outermost rhombus may be designed with longer wing elements, and sweep a larger area than the other rhombuses. All to harvest more energy from the wind. By designing a wing as a triangle (=half-rhombus) closest to the axis of rotation and a complete rhombus, or several complete rhombuses, we get a dynamically adjustable wing. The wind turbine is provided with two, tree or more such wings to achieve an aerodynamically advantageous design.

An advantageous feature of a wind turbine according to the present invention is, that there is no need to design wind turbines adopted for wind speeds according to different Weibull distributions in different districts, because a wind turbine according to the invention is dynamically adjustable to optimize the power coefficient for different wind speeds, hence it can also adjust for different wind speeds according to different Weibull distributions. A wind turbine according to the invention does not need to be adopted for the district it will be erected in, on the contrary it is a standard design, for a nominal rated power, adjustable for all places. This, of course, gives a great economical advantage in mass production.

To control the protrusion of the wings from the axis of rotation the torsion links are adaptable between different rhombus configurations. This is done by stationary attaching one end of the innermost wing element at a fixed height on the axis of rotation, while the innermost end of the complementary wing element of this torsion link is attached to a ring-shaped device, which is adjustable along the height of the axis of rotation. The adjustment may be done by mechanical means, which raises or lowers the ring-shaped device. Thereby changing the distance between the innermost ends of the wing elements of the innermost torsion link. When these ends are brought closer to each other the angle between the wing elements and the axis of rotation increases, and the outer torsion links are extended outwards, thereby increasing the diameter of the wind turbine. Inversely the diameter of the wind turbine decreases, if the ring-shaped device around the axis of rotation is displaced in such a way that the distance between the ends of the wing elements is increased and the angle between the wing elements and the axis of rotation is decreased.

The mechanical means for adjustment of the ring-shaped device round the axis of rotation can be constituted by pneumatic, or preferably hydraulic actuators, or by electrically powered actuators. The ring-shaped device can also be mounted inside a tubular axis of rotation and be attached to the torsion linked wing elements through slots in the tubular axis of rotation. Regardless of the source of power to adjust the torsion links, this adjustment should be of such a range that the torsion links should be able to get in close contact with the axis of rotation. This is to protect the torsion links and the wind turbine at very high wind speeds.

The torsion links of the wind turbine unfold upwards both of mechanical reasons, to obtain as uncomplex design as possible of the actuator which allows the adjustment of the torsion links, and aerodynamic reasons, because the wind speeds are in general higher further up from the ground.

A wind power plant with wind turbine according to the current invention is in its basic design possible to build in highly varying dimensions. Thanks to its high efficiency it is economically feasible to build even rather small wind power plants, when there is a limited need of energy. Hence it is possible to supply consumers with electricity even if they are far away from electric power lines. It is then possible to erect a wind power plant on for example the ceiling of a factory, or atop a tower or a lattice mast in the vicinity of the factory.

The wind turbine powers a hydraulic pump, preferably a multi piston pump design for low rpm, and equipped with a displacement adjusting device. The pump powers one or more hydraulic motors designed for high rpm, which each powering an electric generator. This arrangement makes it possible at low wind speeds to disconnect a motor or a generator for maintenance, while the other one(s) remain in operation.

The hydraulic pump, which may have an additional spare pump, or the pumps when harvesting lots of energy, is placed with suitable transmission in the vicinity of the turbine. It is also possible to pump the hydraulic oil to a pressure tank and then on to hydraulic motors with electric generators inside a workshop.

Because the wind turbines torsion linked wings can be pulled in to a very small radial extension it is possible to supply the wind power plant with folding mechanism, which makes it possible to fold the wind turbine for service. The folding mechanism also make it possible to fold the wind turbine when there is a risk for extreme wind conditions, such as typhoons, using the folded position to protect the wind turbine in appropriate equipment.

The characterizing feature of the invention of dynamically adjusting the wind turbine takes place as described in the following.

At low wind speeds the wind turbine is adjusted to its most extended position, to lower the cut-in wind speed as much as possible, and to increase the power coefficient for low wind speeds.

For modest to strong wind speeds the wind turbine is adjusted to sweep maximal area and to maintain a high efficiency, i.e. high power coefficient.

Finally for high wind speeds the wind turbine is adjusted to maintain a high power coefficient, but to sweep a smaller area and, thus, limit the amount of energy harvested from the wind to less than energy than the electric generator is designed for.

A wind turbine according to the invention does not in difference to conventional, nonadjustable, wind turbines need to be stopped at high wind speeds. On the contrary, the wind turbine is adjusted to suitable radius on the torsion link wing and, thus, continues to produce energy all the way up to its very high cut-out speed, this while maintaining a high efficiency, high power coefficient.

A wind turbine according to the invention can also be equipped with on the wing elements placed, during usage dynamically adjustable parts such as flaps, or similar devices, to obtain an aerodynamically preferable design, to harvest more energy from the wind and to make possible to extract energy from winds that blows at an askew angle, i.e. not at right angle through the wind turbine. This make it possible to place a wind power plant with a wind turbine according to the invention in areas with varying ground conditions and atop buildings and in general in places where the winds do not blow horizontally. Hereby increasing the total power efficiency thanks to the wind turbines adaptability to different wind speeds.

The invention also make it possible to connect additional generators to make it possible to harvest the very high power of winds at high wind speeds.

BRIEF DESCRIPTION OF THE DRAWINGS

A preferred embodiment of the new wind power plant will be described in the following, with reference to the following figures.

These show respectively

DETAILED DESCRIPTION OF THE PREFERRED EMBODIMENTS

Figure 1:
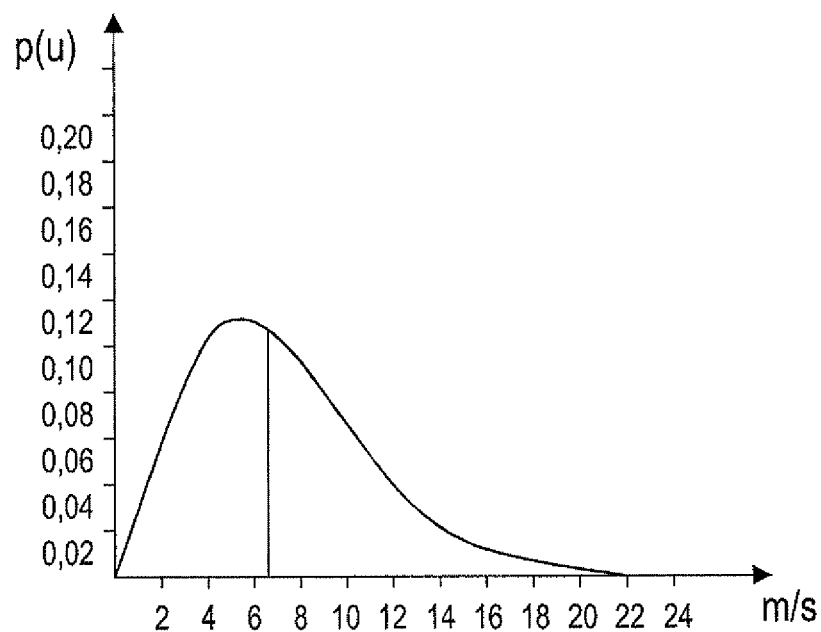
FIG. 1 a diagram showing a Weibull distribution with average wind speed 7 m/s and a shape parameter=2, FIG. 2 total power of the wind, extractable power according to Betz law and the output power from a wind power plant, FIG. 3 a diagram showing a graph of the power coefficient for a traditional wind power plant with a horizontal axis of rotation and a tree-bladed turbine, FIG. 4 a schematic view of a vertical axis of rotation with torsion link wing elements extended to an intermediate position, FIG. 5 a schematic view of the design of a torsion link wing, FIG. 6 a schematic view of a wind power plant according to the invention, FIG. 7 a schematic view of two torsion linked wing elements connected at half-length, and FIG. 8 a schematic view of the connection between the ends of two wing elements.
Figure 2:
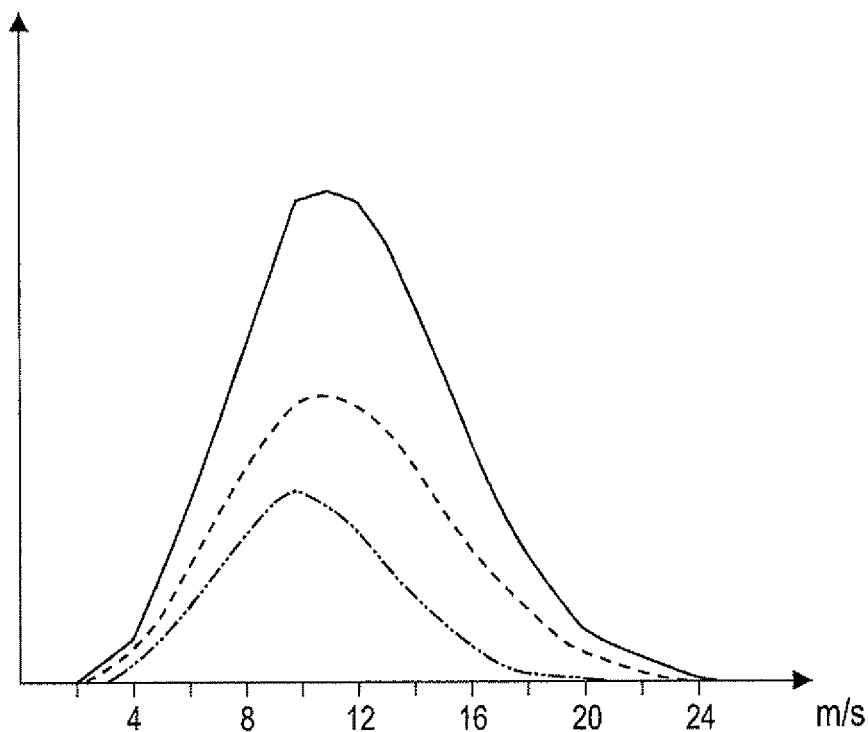
Figure 3:
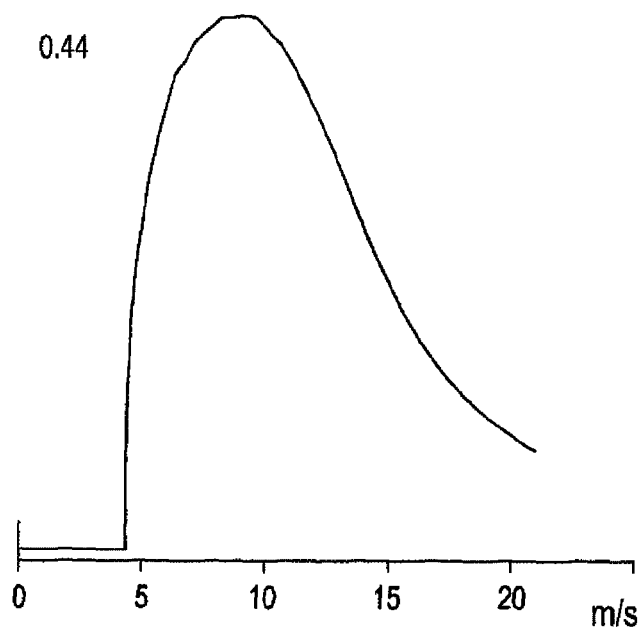
Figure 4:
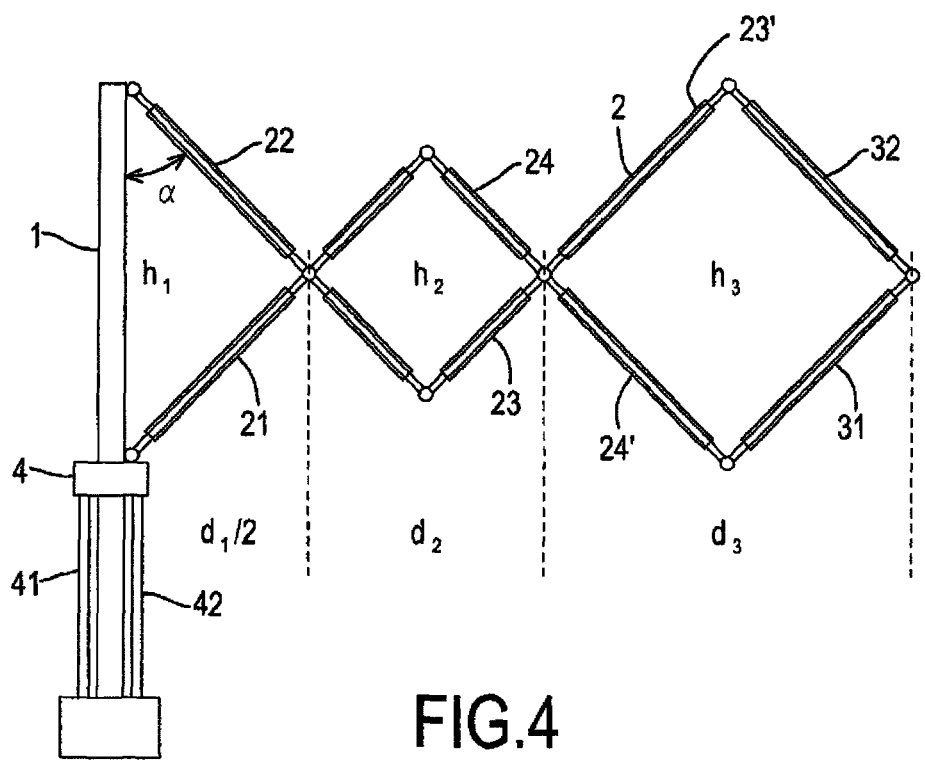
Figure 5:
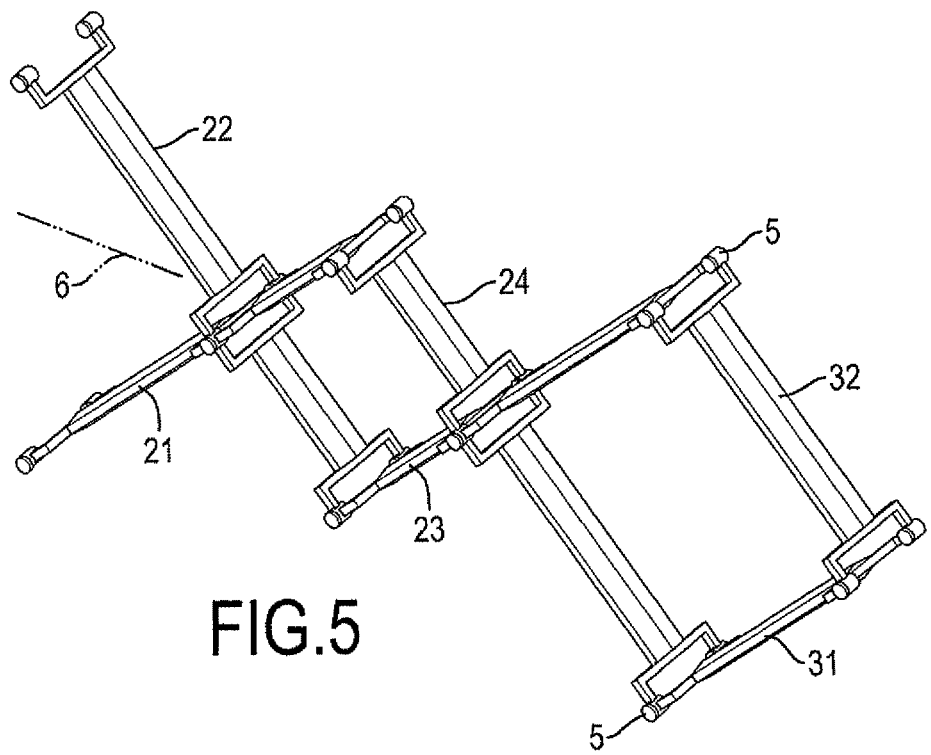
Figure 6:
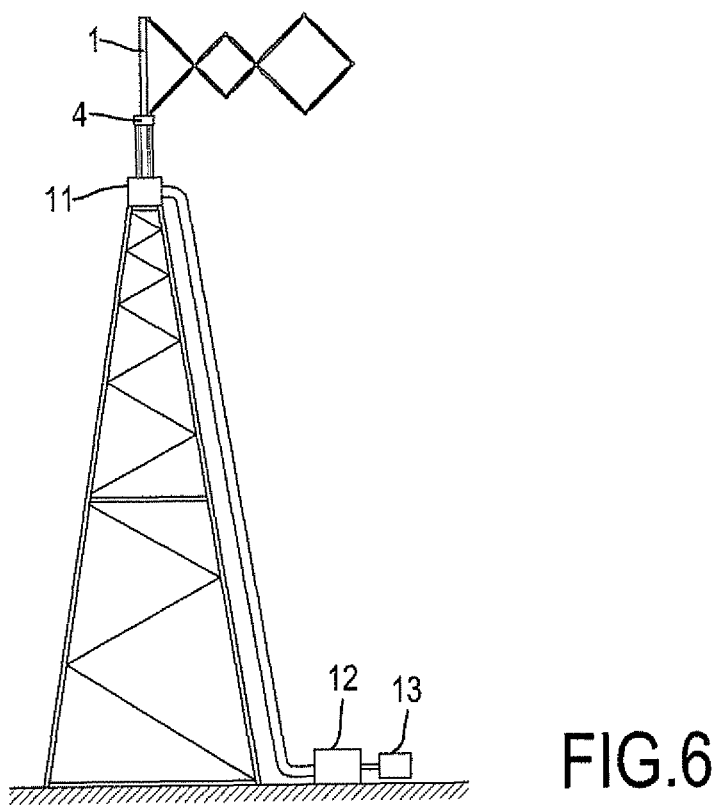
Figure 8:
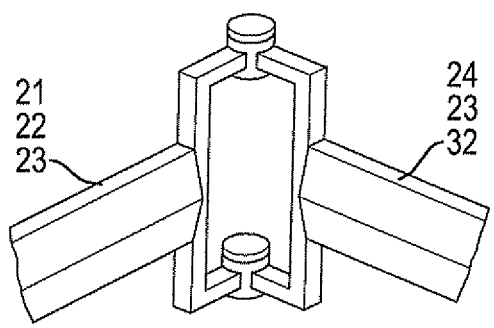

FIG. 4 shows in principle how a wind power plants axis of rotation 1 is arranged vertically, and how in example a wing 2 extends therefrom. This wing 2 is composed of a number of wing elements or turbine blades 21, 22, 23 and 24, which are connected in a torsion link arrangement 21 and 22 respectively 23 and 24. At the outer ends 23' and 24' of turbine blades 23 and 24 respectively wing elements 31 and 32 are hingedly connected, see FIG. 8. These two wing elements 31, 32 are jointly connected to each other at the outermost ends according to FIG. 8. Thus we have extending from the axis of rotation 1 two full length and one half length (wing elements 31 and 32) torsion links, or one half and two full rhombuses, namely h1, h2 and h3.

A corresponding wing extends advantageously on the other side of the axis of rotation 1, i.e. at 180× angle to the wing shown in FIG. 4. The shown wing 2 is comprised of wing elements of equal length, but the hinging point on the torsion links are not at the middle of the wing elements, thus the wing forming rhombuses are of different size. Naturally, the wings can be made of rhombuses of equal size, but because most of the wind energy can be harvested furthest from the axis of rotation 1, it is most advantageous to use the pictured design of the wings. It is also possible to equip the wing 2 with one or more additional rhombuses, which are of smaller than, or of equal size to the outermost rhombus (h3).

The number of wings 2 is a design choice. By the design of the wings, and above all by the ability to adjust the amount of extension from the axis of rotation, it is possible to use a wind power plant of a standardized size to service districts with different Weibull distributions of wind speeds during a year. If a mistake has been made during planning of a wind power plant and the district were the wind power plant is erected have a different Weibull distribution of wind speeds than planned, the only consequence will be that the wind turbine will have a different extension of the wings than the planning had predicted, this in different from a classic static wind turbine where it may have been necessary to change the wind turbine.

To control the extension of the torsion linked wing 2 the innermost end of the wing element 21, towards the axis of rotation 1, is attached to a sleeve means 4 surrounding the axis of rotation 1. This sleeve 4 is slidable up and down along the axis of rotation 1 using hydraulic actuators 41, 42. Alternatively, the sleeve 4 is slidable using cam feedings or set screws as actuators, or electrically powered means. The sleeve 4 can also include means that, for example, control flaps on the wing elements.

When the sleeve 4 is adjusted up along the axis of rotation 1 the torsion links of the wing 2 extends from the axis of rotation 1, and the wing 2 sweeps a larger radius. When the sleeve 4 is adjusted down along the axis of rotation 1 the torsion links of the wing 2 will be pulled together towards the axis of rotation 1, and the wing 2 sweeps a smaller radius. Raising or lowering the sleeve 4 makes it possible to adjust the area swept by the wind turbine and, hence, the energy harvested from the wind will change.

Alternatively, the wing 2 can instead of the sleeve 4 be equipped with prestressed springs 5 mounted in the hinges between for example wing elements 23 and 32, respectively between wing elements 24 and 31 to extend the wing 2 outwards. Additional prestressed springs may be mounted between the other wing elements in their connecting joints. Contraction of the torsion link wing elements may be done by pulling on a wire 6 between the axis of rotation 1 and the connection joint between the wing elements 21 and 22. The wire 6 is maneuvered by a device in a tubular axis of rotation. Alternatively the wire 6 can be replaced with a cam feeder or a set screw as actuator.

Up to a certain size of the wind turbine mounted on a lattice mast it is possible to, by means of a hinge mounting arrangement, lower the wind turbine to the ground.

The wind power plants axis of rotation 1 can power a hydraulic pump 11, either directly or via a transmission. The hydraulic pump is preferably placed at the lower end of the axis of rotation. There are at least two hydraulic oil hoses connected to the hydraulic pump; one as a feeder hose to and one as return hose from one, or more, hydraulic motors 12. These are of high speed designs and connected directly to electric generators 13 to produce electricity.

Figure 7:
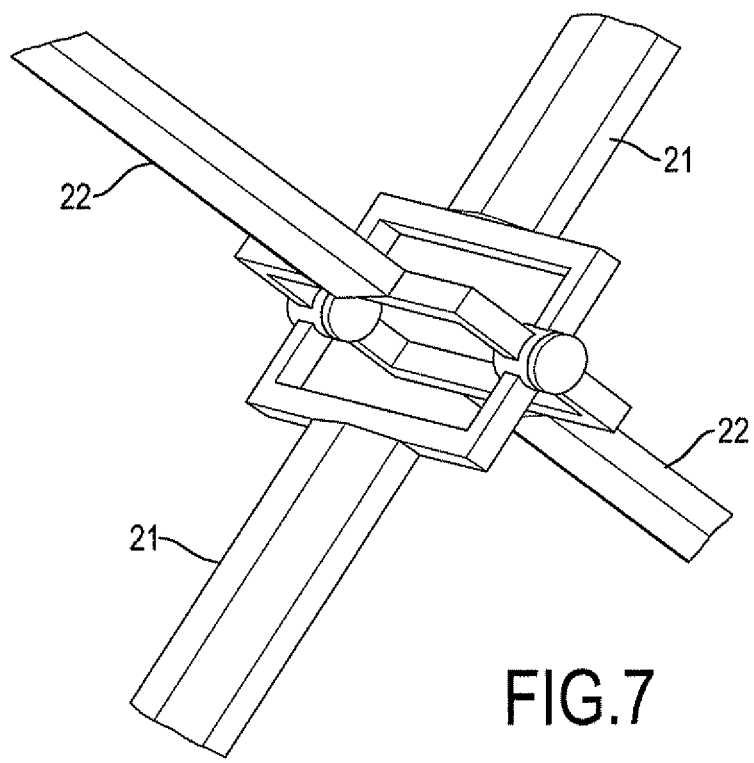

The connection in pairs of wing elements 21, 22, at the middle, is shown in FIG. 7. The wing elements 21, 24 are in proximity to, and connected to, each other by hinge-like design shown in FIG. 8. It is also possible to use other, for those skilled in the art, obvious hinge-like designs.

By connecting a computer it is possible to introduce several different controller functions. Thus, variations in wind speed can be met by computer controlled extension of the wings.

A number of designs presented here are also adaptable to wind turbines with horizontal axis of rotation.

What is claimed is:

1. Wind power plant with a vertical axis of rotation from which adjustable wings extend, characterized by the wings (2) being composed of wing elements (21-24 and 31, 32) connected in a torsion link arrangement for continual extendibility from the axis of rotation (1) as well as retractability towards said axis, wherein the extension of the wings (2) is controlled, independent of a rotation speed of the axis (1) of rotation, and is adjusted by a driving means, applied at a sleeve (4) for adjustment on axis (1) of rotation, the driving means being electrically, hydraulically or pneumatically powered, and wherein the sleeve (4) for adjustment on the axis (1) of rotation constitutes a sleeve surrounding the axis (1) of rotation, to which the innermost wing elements (21, 22) of the wings (2) are coupled, which the sleeve (4) for adjustment is slidable along the axis (1) of rotation.

2. Wind power plant according to claim 1, characterized by the wings (2) being composed of two torsion links, wherein one of the wing elements is connected at a half length of the torsion link arrangement to another wing element.

3. Wind power plant according to claim 1 or 2, characterized by the wings (2) being retractable into the axis (1) of rotation for protection, wherein the wings (2) are retractable into elongated openings along the axial direction of the axis (1) of rotations.

4. Wind power plant according to claims 1 or 2, characterized by the axis (1) of rotation's lower end being movable mounted in the upper part of a tower or a lattice mast, wherein the axis (1) of rotation powers a hydraulic pump (11) directly or via a transmission.

5. Wind power plant according to claim 4, characterized by the hydraulic pump (11) being displacement controlled, and connected to one or more hydraulic motors (12), which in turn powers one or more electricity producing generators (13).

6. Wind power plant according to claim 5, characterized by the wing elements (21-24 and 31, 32) being provided with flaps.

7. Wind power plant according to claim 1 or 2, characterized by the axis (1) of rotation, directly or via a transmission, powering an electricity producing generator.

8. Wind power plant according to claim 1 or 2, characterized by the wings (2) being made of dynamically adjustable wing elements (21-24 and 31, 32) which, like a helicopter rotor, are adjusted for optimal harvesting of wind energy from winds blowing at an angle to the ground plane.

* * * * *